United States Patent [19]

Henry

[11] 3,949,541

[45] Apr. 13, 1976

[54] ROTARY MOWER BLADE WITH DETACHABLE END MEMBERS

[76] Inventor: Keith V. Henry, Box 12, Harlan, Ind. 46743

[22] Filed: Nov. 14, 1974

[21] Appl. No.: 523,913

[52] U.S. Cl. .............................................. 56/295
[51] Int. Cl.² ....................................... A01D 55/18
[58] Field of Search ..................................... 56/295

[56] References Cited
UNITED STATES PATENTS

| | | | |
|---|---|---|---|
| 3,243,944 | 4/1966 | Michaud | 56/295 |
| 3,321,894 | 5/1967 | Ingram | 56/295 |
| 3,452,524 | 7/1969 | Guetterman | 56/295 |

*Primary Examiner*—Louis G. Mancene
*Assistant Examiner*—Daniel J. Leach
*Attorney, Agent, or Firm*—Albert L. Jeffers; Roger M. Rickert

[57] ABSTRACT

A rotary mower blade which is made up of a central section adapted for connection to the mower output shaft and having end members detachably mounted thereon which can be removed for sharpening or which can be replaced. The end members, which form the blade proper, are sharpened or serrated along one edge and have an upstanding flange at the rear edge for developing a fan action. When the blade members are mounted on the central section they are locked in place against either endwise or rotating movement thereon.

8 Claims, 4 Drawing Figures

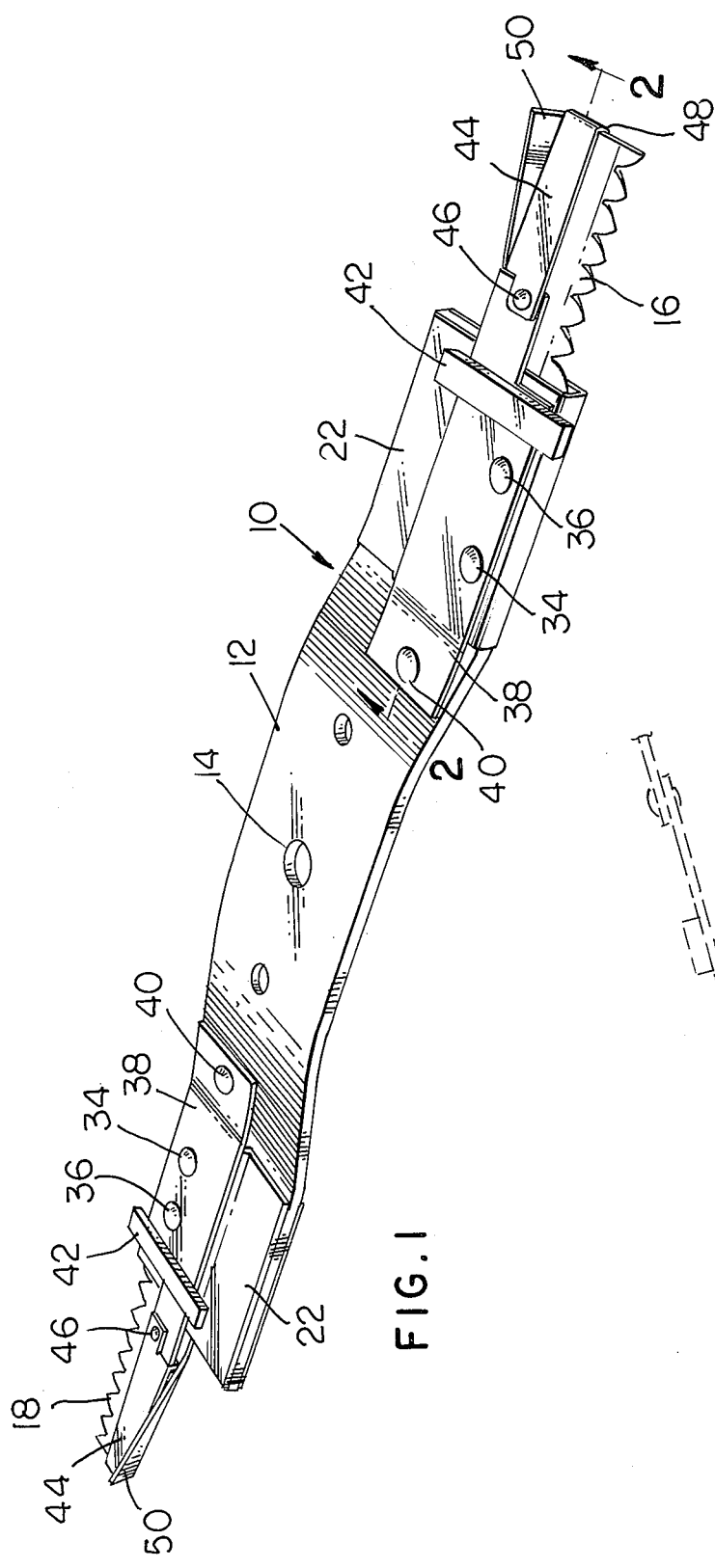

ROTARY MOWER BLADE WITH DETACHABLE END MEMBERS

The present invention relates to rotary mower blades and is particularly concerned with a rotary mower blade having detachable end sections or members mounted thereon.

Rotary mowers are, of course, well known as are blades for rotary mowers. Furthermore, it is known to provide rotary mowers with blades in which the end sections are removeably connected thereto. The end regions of rotary mower blades are the regions which accomplish the cutting so that a relatively short blade member mounted on each end of a rotary central section provides adequate cutting efficiency for the blade.

The principal object of the present invention is the provision of an improved arrangement for detachably mounting blade members on the ends of a central section with the central section adapted for connection to a mower output shaft for rotation of the entire blade assembly thereby.

Another object is the provision of an arrangement for mounting blade members on the ends of the central section of the rotary mower blade in such a manner that the blade members are securely held in position against becoming accidentally dislodged and which connecting means also holds the blade members firmly against deflecting under load.

A still further object is the provision of a safety hook arrangement which hooks over the radially outer end of each blade member thereby additionally insuring that the blade member will not become displaced radially outwardly on the central section.

BRIEF SUMMARY OF THE INVENTION:

A rotary mower blade is provided which is made up of a central section adapted for connection to a mower output shaft to be rotated thereby. Each end of the central section is formed with pocket means and each pocket means is adapted slidably to receive a respective blade member from the radially outer end of the pocket means.

A pair of radially spaced apertures are provided extending through each blade end and the respective pocket means and these apertures align with other apertures formed in the respective blade members when the blade member is seated properly in the respective pocket means.

Pins are provided which are mounted on leaf springs connected to the central section and which pins are biased by the leaf spring into the aforementioned apertures so that when the pins are in the apertures the respective blade member is locked to the central section of the blade.

Each leaf spring also has a hook pivotally connected thereto which is engageable over the radially outer end of the respective blade member so as further to insure that the blade member will not move radially outwardly on the central section of the blade. Each blade member has the leading edge formed for cutting, and this may take the form of sharpening the leading edge of the blade member while forming it to a serrated configuration or a configuration consisting of a plurality of V-shaped teeth on side by side relation.

Each blade member has a flange turned up at the rearward edge and this flange not only provides a stop for the aforementioned hook to prevent the hook from becoming disengaged but, also, provides a fan action within the housing of the mower which surrounds the mower blade.

Advantageously, each leaf spring, and which is preferably relatively stiff, has a finger piece connected thereto projecting laterally from the envelope of the blade so that the leaf springs can be moved to disengage the pins from the aforementioned apertures to permit the removal of a blade member.

The exact nature of the present invention will become more clearly apparent upon reference to the following detailed specification taken in connection with the accompanying drawings in which:

FIG. 1 is a perspective view showing a rotary mower blade according to the present invention.

FIG. 2 is a longitudinal section indicated by line 2—2 on FIG. 1.

Figures 3, 4:
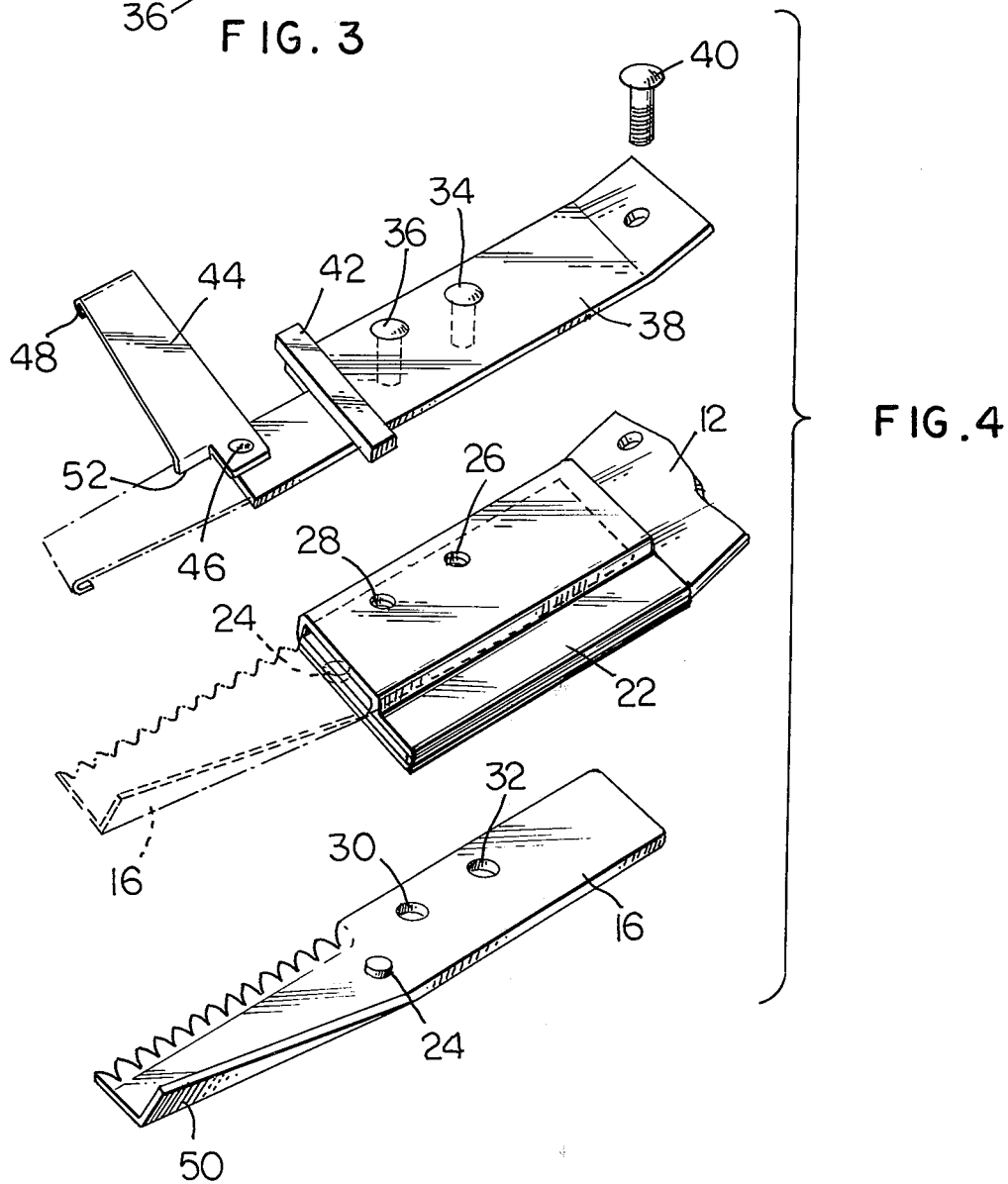
FIG. 3 is a transverse section indicated by line 3—3 on FIG. 2.
FIG. 4 is an exploded perspective view showing one end of the central section of the blade and the parts connected thereto and the blade member which is detachably mounted thereon.

DETAILED DESCRIPTION OF THE INVENTION:

Referring to the drawings somewhat more in detail, a rotary mower blade is generally indicated at 10 in FIG. 1 and will be seen to comprise a central section 12 having a central aperture 14 for mounting thereof on a mower output shaft. The radially outer ends of central section 12 are bent downwardly out of the plane of the middle portion of a central section in a more or less conventional manner.

Central section 12 is, however, shorter than a conventional mower blade and has detachably mounted on the opposite ends blade members 16 and 18. For receiving blade members 16 and 18, each end of central section 12 is provided with a radial pocket 20 which may be formed in any conventional manner but which, conveniently, is formed by a sleeve-like element 22 mounted on each end of central section 12 and shaped to define a pocket about as wide as a said blade member and which is somewhat more narrow than the central section 12.

The pocket is disposed toward the leading side of the respective end of central section 12 so that the leading side of each blade member 16 and 18 is about aligned with the leading side of the respective end of central section 12.

Each blade member, as shown in connection with blade member 16, is provided with a stop button or pin 24 adapted for abutting the radially outer end of the respective end of central section 12 or the sleeve element mounted thereon thereby to position the blade member radially on the central section.

The sleeve element 22 and the central section 12 of the blade are provided with apertures 26 and 28 which register with apertures 30 and 32 respectively in blade member 16 when the blade member is in the proper position in the respective pocket means.

Pins 34 and 36 are provided for insertion into the apertures for locking the blade member in place. These pins are mounted on a leaf spring 38 connected as by bolt 40 to the central section 12 at a point radially inwardly from pins 34 and 36.

Advantageously, leaf spring 38 has a finger piece 42 fixed thereto so that the leaf spring can be moved to its dot-dash position in FIG. 2 thereby to withdraw pins 34 and 36 from the apertures and release a respective blade member.

For added security, the radially outer end of each leaf spring has a bar 44 pivoted thereto as by pivot pin 46. Bar 44 has a hook 48 on the end engageable over the radially outer end of the respective blade member thereby further insuring that the blade member cannot move radially outwardly in its pocket.

Each blade member advantageously has a flange 50 upstanding from the rearward edge which not only serves as a stop for bar 44 but which, also, provides for a fan action as the mower blade rotates.

As will be seen in FIG. 4, each bar 44 may have a tab 52 turned down thereon for abutment with the radially outer end of the respective leaf spring element 38 for stopping the bar in its blade engaging position. It will be noted, however, that the flange 50 on each blade member also provides a stop for the respective bar 44 in addition to providing for the aforementioned fan action.

It should be understood that the pocket 20 can receive blades having a different thickness for cutting and leaf mulching. For example, a lighter blade having a thickness of about 3/32 of an inch could be used for cutting regular grass. A shim (not shown) could be used with the lighter blade to provide a closer fit within the pocket 20. A blade having a thickness of about 6/32 of an inch can be used for cutting heavier grass or for leaf mulching. Both types of blades would be of the same configuration except for the thickness of metal.

Modifications may be made within the scope of the appended claims.

What is claimed is:

1. A blade for a rotary mower comprising; a central section including means for connection thereof to the mower output shaft, and blade members detachably mounted on the ends of said central section, each blade member having aperture means therein adapted to register with aperture means in the respective end of said central section, a spring element including mounted pin means on said central section adapted for being received in said aperture means thereby to engage said blade members and lock the blade members to the central section, and a hook element movably mounted on each said spring element and engageable over the radially outer end of the respective blade member when the blade member is in the proper position on the said central section.

2. A blade according to claim 1 which includes sleeve-like pocket means on each end of said central section adapted slidably to receive said blade members from the radially outer ends of the pocket means, said aperture means in said central section extending through said pocket means, leaf spring elements having the radially inner ends fixed to said central section and having said pin means thereon near the radially outer ends, said spring elements biasing said pin means in blade member engaging direction, means for moving said spring elements in a direction to disengage said pin means from said blade members, and stop means on said blade members for abuttingly engaging at least one of the respective pocket means and the pertaining end of the said central section when the blade member is inserted the proper distance into the pocket means.

3. A blade according to claim 1 which includes sleeve-like pocket means on each end of said central section adapted slidably to receive said blade members from the radially outer ends of the pocket means, said aperture means in said central section extending through said pocket means, leaf spring elements having the radially inner ends fixed to said central section and having said pin means thereon near the radially outer ends, said spring elements biasing said pin means in blade member engaging direction, means for moving said spring elements in a direction to disengage said pin means from said blade members, and a hook element moveably mounted on each said spring element and engageable over the radially outer end of the respective blade member when the blade member is in the proper position in the respective pocket means.

4. A blade according to claim 3 which includes stop means on said blade members for abuttingly engaging at least one of the respective pocket means and the pertaining end of the said central section when the blade member is inserted the proper distance into the pocket means.

5. A blade according to claim 1 in which the leading edge of each blade member is serrated.

6. A blade according to claim 1 in which the trailing edge of each blade member has a flange upstanding therefrom.

7. A blade according to claim 1 in which the trailing edge of each blade member has a flange upstanding therefrom, each flange tapering from a lower height at the radially inner end to a greater height at the radially outer end.

8. A blade according to claim 1 wherein each said spring element is provided with a lift member fixed thereto near the radially outer end of the spring element for movement of the respective spring element in the direction to disengage said pin means from the respective blade member.

* * * * *